United States Patent
Uda et al.

(10) Patent No.: US 10,906,004 B2
(45) Date of Patent: Feb. 2, 2021

(54) SPIRAL MEMBRANE MODULE

(71) Applicant: Nitto Denko Corporation, Ibaraki (JP)

(72) Inventors: Yasuhiro Uda, Ibaraki (JP); Kentarou Kobayashi, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 16/302,265

(22) PCT Filed: Mar. 29, 2017

(86) PCT No.: PCT/JP2017/012840
§ 371 (c)(1),
(2) Date: Nov. 16, 2018

(87) PCT Pub. No.: WO2017/203825
PCT Pub. Date: Nov. 30, 2017

(65) Prior Publication Data
US 2020/0070096 A1   Mar. 5, 2020

(30) Foreign Application Priority Data
May 23, 2016 (JP) ................. 2016-102541

(51) Int. Cl.
*B01D 63/00* (2006.01)
*B01D 63/10* (2006.01)
(Continued)

(52) U.S. Cl.
CPC ............. *B01D 63/10* (2013.01); *B01D 63/00* (2013.01); *B01D 63/103* (2013.01);
(Continued)

(58) Field of Classification Search
CPC .... B01D 63/10; B01D 63/00; B01D 2315/10; B01D 65/003; B01D 63/106;
(Continued)

(56) References Cited

U.S. PATENT DOCUMENTS

2006/0213821 A1* 9/2006 Choi ..................... B01D 35/30
                                                              210/136
2009/0277825 A1   11/2009 Beppu et al.
(Continued)

FOREIGN PATENT DOCUMENTS

CN      101340970 A      1/2019
JP      S50146572         11/1975
(Continued)

OTHER PUBLICATIONS

Japanese Office Action, dated Jan. 7, 2020, in corresponding Japanese Patent Application No. 2016-102541.
(Continued)

*Primary Examiner* — Angel Olivera
(74) *Attorney, Agent, or Firm* — Knobbe Martens Olson & Bear, LLP

(57) ABSTRACT

Provided is a spiral membrane module which is suitable for being set up in the vertical direction since at one end of its pressure vessel, the supply of feed liquid and the discharge of concentrated liquid can be attained.

6 Claims, 9 Drawing Sheets

(51) Int. Cl.
*C02F 1/44* (2006.01)
*B01D 65/00* (2006.01)

(52) U.S. Cl.
CPC .......... *B01D 63/106* (2013.01); *B01D 65/003* (2013.01); *B01D 2313/08* (2013.01); *B01D 2313/10* (2013.01); *B01D 2313/105* (2013.01); *B01D 2313/125* (2013.01); *B01D 2313/143* (2013.01); *B01D 2313/21* (2013.01); *B01D 2315/10* (2013.01); *C02F 1/441* (2013.01); *C02F 1/442* (2013.01); *C02F 1/444* (2013.01)

(58) Field of Classification Search
CPC ........ B01D 2313/105; B01D 2313/143; B01D 2313/08; B01D 2313/10; B01D 2313/125; B01D 2313/21; B01D 63/103; B01D 65/00; B01D 61/10; B01D 2313/20; B01D 2313/025; B01D 2313/14; C02F 1/444; C02F 1/442; C02F 1/441
See application file for complete search history.

(56) References Cited

U.S. PATENT DOCUMENTS

2013/0256209 A1* 10/2013 Volker .................. B01D 63/10
                                                           210/321.6
2016/0207003 A1* 7/2016 Nishioka .............. B01D 63/106
2017/0036168 A1 2/2017 Lim et al.

FOREIGN PATENT DOCUMENTS

| JP | H01163492 U | 11/1989 | |
| JP | H08299766 | 11/1996 | |
| JP | H10137558 | 5/1998 | |
| JP | 2001246233 | 9/2001 | |
| JP | 2004275817 | 10/2004 | |
| WO | WO-2015041263 A1 * | 3/2015 | ........... B01D 63/106 |
| WO | WO2015163632 | 10/2015 | |

OTHER PUBLICATIONS

International Preliminary Report on Patentability and Written Opinion of the International Searching Authority, dated Dec. 6, 2018, in corresponding international patent application No. PCT/JP2017/012840.
International Search Report, dated Jun. 6, 2017, in corresponding International Patent Application No. PCT/JP2017/012840.
Chinese Office Action, dated Sep. 2, 2020, in corresponding Chinese Patent Application No. 201780027797.6.
Korean Officer Action dated Apr. 14, 2020, in corresponding Korean Patent Application No. 10-2018-7033567.

* cited by examiner (a)

(b)

SPIRAL MEMBRANE MODULE

TECHNICAL FIELD

The present invention relates to a spiral membrane module in which a spiral membrane element is held in a pressure vessel.

BACKGROUND ART

As the structure of a conventional spiral membrane element (hereinafter also referred to merely as a "membrane element"), known is a structure equipped with a wound body yielded by winding one or more separation membranes, supply-side flow-channel members and permeation-side flow-channel members onto a perforated central pipe (see, for example, Patent Document 1).

FIG. 9 is a perspective view of a conventional membrane element, this view being obtained by cutting the membrane element partially. The membrane element illustrated in this figure, which is a membrane element 1, has a structure yielded by winding, around a central pipe 5, membrane members including separation membranes 2, supply-side flow-channel members 6, and permeation-side flow-channel members 3. More specifically, envelope-form membranes (baglike membrane) are each formed by putting two of the separation membranes 2, respectively, onto both surfaces of one of the permeation-side flow-channel members 3, and then bonding these members to each other at their three sides. Openings in the envelope-form membranes are fitted to the central pipe 5. The resultants are spirally wound, together with the net-form supply-side flow-channel members 6, onto the outer peripheral surface of the central pipe 5. In this way, the membrane element is formed. On an upstream side of this wound body R, an upstream-side end member 10, such as a seal carrier, is located; and on a downstream side thereof, a downstream-side end member 12, such as a telescoping preventing member, is located.

When this membrane element 1 is used, a feed liquid 7 is supplied from one of the two end surface sides of the membrane element 1. The supplied feed liquid 7 flows along the supply-side flow-channel members 6 in a direction parallel with an axial direction of the central pipe 5 to be discharged as a concentrated liquid 9 from the other end surface side of the membrane element 1. As represented by broken-line arrows in the figure, a permeation liquid 8 that has permeated the separation membranes 2, in a step in which the feed liquid 7 flows along the supply-side flow-channel members 6, flows along the permeation-side flow-channel members 3 from openings 5a to the inside of the central pipe 5, and is then discharged from one of the ends of this central pipe 5.

A conventional spiral membrane module, in which such a membrane element 1 is held in a pressure vessel, has a structure in which: the pressure vessel has, at one of the two ends thereof, a supplying portion for feed liquid, and has, at the other end, a discharge portion for concentrated liquid, and a discharge portion for permeation liquid; and the feed liquid flows into the membrane element 1 by effect of a sealing member located on the outer periphery of the upstream-side end member 10.

Patent Document 2 suggests a spiral membrane module in which outside the membrane element, a concentrated liquid discharged from the membrane element held in a pressure vessel is caused to flow in a reverse direction, and then discharged from a discharge portion located at a position near a supplying portion for feed liquid in an external cylinder of a pressure vessel.

PRIOR ART DOCUMENTS

Patent Documents

Patent Document 1: JP-A-10-137558
Patent Document 2: JP-A-2004-275817

SUMMARY OF THE INVENTION

Problems to be Solved by the Invention

However, it is presumed that the spiral membrane module described in Patent Document 2 is set up to make the axial direction thereof horizontal. It is therefore necessary that when the spiral membrane module is set up to make the axial direction thereof perpendicular, a pipe is connected to a supplying portion, for feed liquid, that is located at an external cylinder. Thus, there arise problems that space saving is not easily attained and the pipe itself becomes complicated. For this reason, it is not mentioned that the spiral membrane module described in Patent Document 2 has a structure suitable for being set up in the vertical direction (perpendicularly).

Thus, an object of the present invention is to provide a spiral membrane module suitable for being set up in the vertical direction since at one end of its pressure vessel, the supply of feed liquid and the discharge of concentrated liquid can be attained.

Means for Solving the Problems

The object can be attained by the present invention as described below.

The spiral membrane element of the present invention incudes:

a membrane element including a central pipe having a hole, a wound body in which a membrane member including a separation membrane, a supply-side flow-channel member and a permeation-side flow-channel member are wound around the central pipe, and an exterior member located on an outer periphery of the wound body;

a pressure vessel that holds the membrane element, that has a supplying portion for a feed liquid and a discharge portion for a concentrated liquid at one out of ends of the pressure vessel in an axial direction of the pressure vessel, and that has a discharge portion for a permeation liquid at any one of the ends in the axial direction; and a liquid-leading member arranged between the one end of the pressure vessel and the membrane element, and having a dividing wall that communicates the supplying portion for the feed liquid with an inside or outside of the exterior member of the membrane element, and further communicates the discharge portion for the concentrated liquid with the inside or outside of the exterior member of the membrane element while the feed liquid and the concentrated liquid are prevented from being mixed with each other.

According to the spiral membrane module of the present invention, the liquid-leading member is arranged between the one end of the pressure vessel and the membrane element. This liquid-leading member has the dividing wall, which communicates the supplying portion for the feed liquid with the inside or outside of the exterior member of the membrane element and which communicates the discharge portion for the concentrated liquid with the inside or outside of the exterior member of the membrane element. Thus, at the one end of the pressure vessel, the supply of the feed liquid and the discharge of the concentrated liquid can be attained. In other words, by means of the dividing wall of the liquid-leading member, the feed liquid led to the outside or the inside of the exterior member of the membrane element flows to the other or a different end of the pressure vessel, and subsequently the feed liquid flows in to the inside of the exterior member of the membrane element or flows out to the outside of the exterior member; and further by means of the dividing wall of the liquid-leading member, the liquid is led to the discharge portion for the concentrated liquid.

Moreover, this dividing wall can prevent the feed liquid and the concentrated liquid from being mixed with each other. Thus, without adopting any especially complicated pipe structure, the membrane module can be formed to have a structure in which the pressure vessel, which holds the membrane element, has at the one end thereof the supplying portion for the feed liquid and the discharge portion for the concentrated liquid. When the spiral membrane module is vertically set up, such a structure attains the saving of a space in which this module is set up, and makes the connection of the module to pipes easy. Consequently, the path of the pipes can be made simple. Thus, the present invention can provide a spiral membrane module suitable for being vertically set up.

It is preferred in this module that the dividing wall of the liquid-leading member is a wall that leads the feed liquid flowing in from the supplying portion for the feed liquid into the outside of the exterior member, and that leads the concentrated liquid flowing out from the membrane element to the discharge portion for the concentrated liquid. In such a structure, the feed liquid led to the outside of the exterior member flows to the other or a different end of the pressure vessel, and subsequently the feed liquid flows to the inside of the exterior member of the membrane element to flow inside of the exterior member. Thus, a pressure difference is generated into a direction in which the outer diameter of the membrane element is reduced. For this reason, the outside of the exterior member becomes higher in pressure, so that the membrane element and the liquid-leading member come to be sealable through a simple means such as a tape.

Moreover, it is preferred that the pressure vessel is located to make the axial direction thereof vertical. By setting up the spiral membrane module vertically in this way, the saving of the setup space can be attained, so that the connection of the module to pipes becomes easy. Accordingly, the path of the pipes can also be made simple.

It is also preferred that the liquid-leading member has a cylindrical dividing wall located adjacently to an end side of the exterior member, a disc-form dividing wall located on an inner peripheral side of the cylindrical dividing wall, and a ring-form dividing wall that communicates an opening made in the disc-form dividing wall with the discharge portion for the concentrated liquid. When the spiral membrane module has these dividing walls, the following can be attained through a simple structure thereof only by arranging the structure between the one end of the pressure vessel and the membrane element: the supplying portion for the feed liquid is communicated with the inside or outside of the exterior member of the membrane element, and the discharge portion for the concentrated liquid is communicated with the inside or outside of the exterior member of the membrane element while the feed liquid and the concentrated liquid are prevented from being mixed with each other.

It is particularly preferred that the liquid-leading member further has a ring-form supporting part located at a center of the disc-form dividing wall to which the central pipe is inserted, and a leg part extended from the disc-form dividing wall or the cylindrical dividing wall to an inner wall of the end of the pressure vessel. When the spiral membrane module is vertically set up, the ring-form supporting part, and the leg part can support the load of the membrane element so that flow-channels for the feed liquid and the concentrated liquid can be ensured while the central pipe is supported.

BRIEF DESCRIPTION OF THE DRAWINGS

FIG. 2(a) is a plan view thereof, and FIG. 2(b) is a bottom view thereof.

MODE FOR CARRYING OUT THE INVENTION

Figure 1:
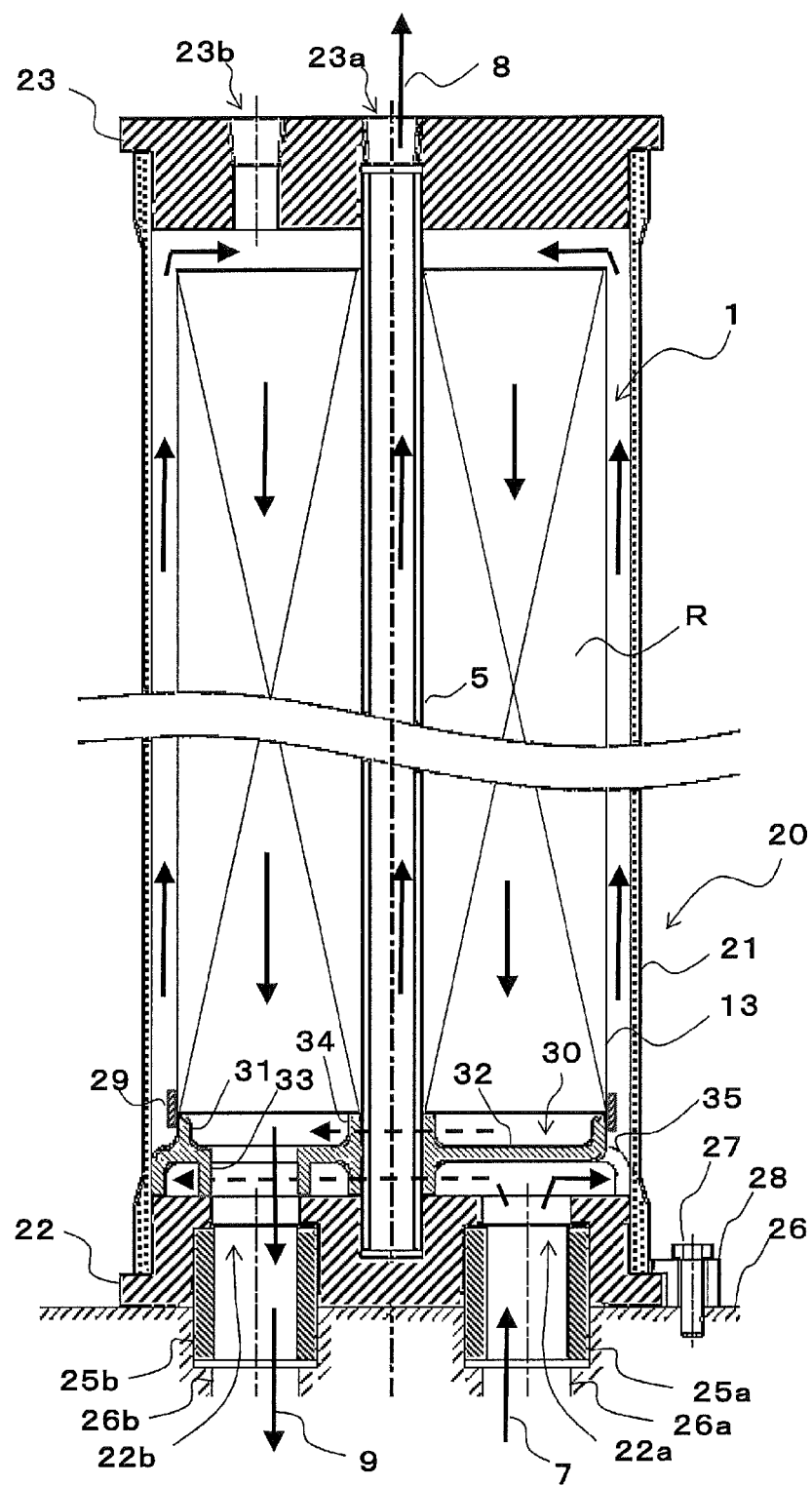
FIG. 1 is a vertically sectional view illustrating an example of the spiral membrane module of the present invention.

As illustrated in FIG. 1, a spiral membrane module of the present invention has a membrane element 1, a pressure vessel 20, and a liquid-leading member 30. Hereinafter, these members will be described in turn.

(Membrane Element)

Figure 9:
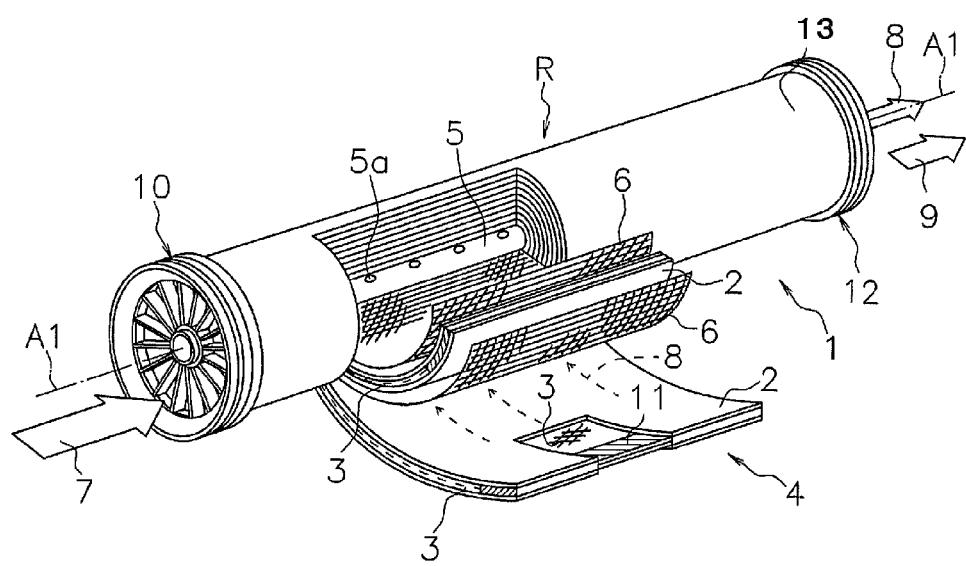
FIG. 9 is a perspective view illustrating an example of a conventional spiral membrane element.

As illustrated in FIG. 9, the membrane element 1 may be the same spiral membrane element as in the prior art; it is however possible to omit the upstream-side end member 10 having, for example, a seal carrier function, and the downstream-side end member 12 having a function as, for example, a telescoping preventing member. Thus, a description will be made with reference to FIG. 9.

As illustrated in FIG. 9, the membrane element 1 is equipped with the following: a perforated central pipe 5 having, in its outer periphery, holes; a wound body R in which membrane members each including one or more separation membranes 2, one or more supply-side flow-channel members 6, and one or more permeation-side flow-channel members 3 are wound around the central pipe 5; and an exterior member 13 located on the outer periphery of the wound body R. In the present embodiment, the demonstrated example is an example in which the plural membrane members, which include the separation membranes 2, the supply-side flow-channel members 6 and the permeation-side flow-channel members 3, are wound around the central pipe 5. However, a single separation membrane unit may be wound around the central pipe.

The membrane element 1 is usually equipped with sealing portions for preventing supply-side flow-channels from being mixed with permeation-side flow-channels. When envelope-form membranes (baglike membranes) are each formed, for example, by putting two of the separation membranes 2, respectively, onto both surfaces of one of the permeation-side flow-channel members 3, and then bonding these members to each other at their three sides, one of the sealing portions 11 is formed at an outer-peripheral-side end side of the envelope-form membrane, and two of the sealing portions are formed at an upstream-side end side thereof, and at a downstream-side end side thereof. It is preferred that one of the sealing portions is further located between the central pipe 5, and inner-peripheral-side ends of the upstream-side end side and the downstream-side end side.

About the envelope-form membranes, their openings are fitted to the central pipe 5. The envelope-form membranes are spirally wound, together with the netlike supply-side flow-channel members 6, onto the outer peripheral surface of the central pipe 5. In this way, the wound body R is formed. On an upstream side of this wound body R, for example, the upstream-side end member 10, such as a seal carrier, may be located; and on a downstream side thereof, the downstream-side end member 12, such as a telescoping preventing member, may be optionally located.

When this membrane element 1 is used, a feed liquid 7 is supplied from one of the two end surface sides of the membrane element 1. The supplied feed liquid 7 flows along the supply-side flow-channel members 6 in a direction parallel with an axial direction of the central pipe 5 to be discharged as a concentrated liquid 9 from the other end surface side of the membrane element 1. As represented by broken-line arrows in the figure, a permeation liquid 8 that has permeated the separation membranes 2, in a step in which the feed liquid 7 flows along the supply-side flow-channel members 6, flows along the permeation-side flow-channel members 3 from openings 5a to the inside of the central pipe 5, and is then discharged from one of the ends of this central pipe 5.

The separation membranes 2, the supply-side flow-channel members 6, the permeation-side flow-channel members 3, and the central pipe 12 may be the same as in the prior art.

The supply-side flow-channel members 6 may each be, for example, a net-form sheet or a mesh-form sheet made of any material. The material is preferably, for example, a polyolefin such as polypropylene or polyethylene. The permeation-side flow-channel members 3 may each be, for example, a net-form sheet or a mesh-form sheet, a grooved sheet, or an undulate sheet made of any material. The separation membranes 2 may each be, for example, a reverse osmosis membrane, a nano-filtration membrane, or an ultra-filtration membrane.

In the same manner as in the membrane element 1 in the prior art, the exterior member 13 may be a resin sheet, a resin tape or a fiber-reinforced resin. A composite structure of two or more of these examples may be used. However, the spiral membrane module of the present invention has, at the outside thereof, the pressure vessel; thus, when the module is handled, it is not feared that the module is damaged. It is therefore possible to adopt the exterior member 13 which is a member smaller in pressure resistance than the conventional membrane element 1. This exterior member 13 is preferably a resin tape, a resin film or a thermally shrinkable tube.

(Pressure Vessel)

As illustrated in FIG. 1, the pressure vessel 20 holds the membrane element 1; and has a supply portion 22a for the feed liquid 7 and a discharge portion 22b for the concentrated liquid 9 at one of the two ends in the axial direction of the vessel, and has a discharge portion 23a for the permeation liquid 8 at either one of the two ends in the axial direction. In the present embodiment, the one end in the axial direction is located at the lower side of the membrane module, and the other end is located at the upper side thereof. A bottom member 22 fitted to the lower side end has the supplying portion 22a for the feed liquid 7, and the discharge portion 22b for the concentrated liquid 9; and an upper member 23 arranged at the upper end has a discharge portion 23a for the permeation liquid 8.

In the present embodiment, the pressure vessel 20 further has a cylindrical member 21. The upper member 23 and the bottom member 22 are fitted, respectively, to the upper end and the lower end of the cylindrical member 21 in a liquid-sealed state. In order to make these members into the liquid-sealed state, for example, an O ring or the like is used, and further various structures for drop off-stopping against the internal pressure may be adopted (all illustrations of the member and the structures are omitted).

The cylindrical member 21 may be made of any material such as a resin, a metal or a ceramic material. From the viewpoint of the pressure-resistant performance of this member, and the lightness thereof, it is preferred to use a cylindrical mold, such as a mandrel, and form the cylindrical member by use of a fiber-reinforced resin in which a reinforced fiber (roving fiber) is wound around this mold.

Figure 2:
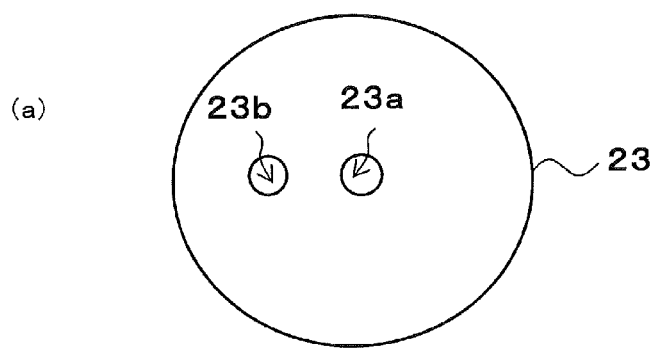
FIG. 2 are each a view illustrating the example of the spiral membrane module of the present invention.
Figure 2:
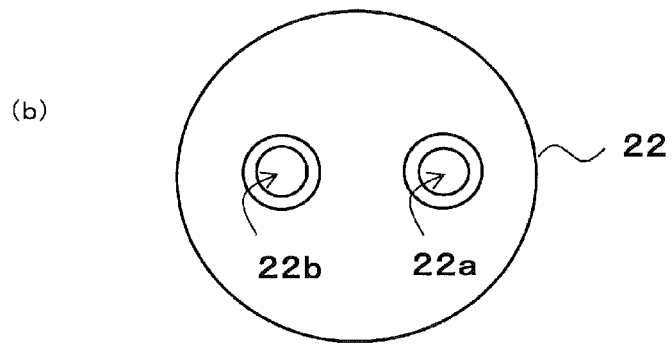

As illustrated in FIGS. 1 to 2(*b*), in the supply portion 22a of the bottom member 22, for supplying the feed liquid 7, and the discharge portion 22b thereof, for the concentrated liquid 9, openings are made. These openings are openings into which connecting pipes 25a and 25b that are to be connected to external pipes are, in a liquid-sealed state, fitted. In the illustrated example, external pipes 26a and 26b are set in a base stand 26, and connecting pipes 25a and 25b are fitted into openings made in the base stand 26 in a liquid-sealed state. In order to make the connecting pipes 25a and 25b into the liquid-sealed state, for example, an O ring is used, and further various structures for drop off-stopping may be adopted (all illustrations of the member and the structures are omitted).

In the illustrated example, the pressure vessel 20 is fixed to the base stand 26 by screwing bolts 27 into screw holes made in the base stand 26 through a fastener 28 engaged with the bottom member 22.

When the upper member 23 has a discharge portion 23a for the permeation liquid 8, it is preferred to locate, into the bottom member 22, a fitting-in part for closing the central pipe 5. In this example, an O ring or the like is held in the fitting-in part of the bottom member 22 to keep the inserted central pipe 5 into a liquid-sealed state (not illustrated).

As illustrated in each of FIG. 1 to FIG. 2(*a*), besides the discharge portion 23a for the permeation liquid 8, an air vent 23b is made in the upper member 23. The discharge portion 23a for the permeation liquid 8 has a fitting-in part for the central pipe 5, and a connecting part for an external pipe. For example, a pipe having a valve is connected to the air vent 23b. When the feed liquid 7 is filled into the pressure vessel 20, the valve is opened. When the spiral membrane module is operated, the valve is closed.

(Liquid-Leading Member)

Figure 7:
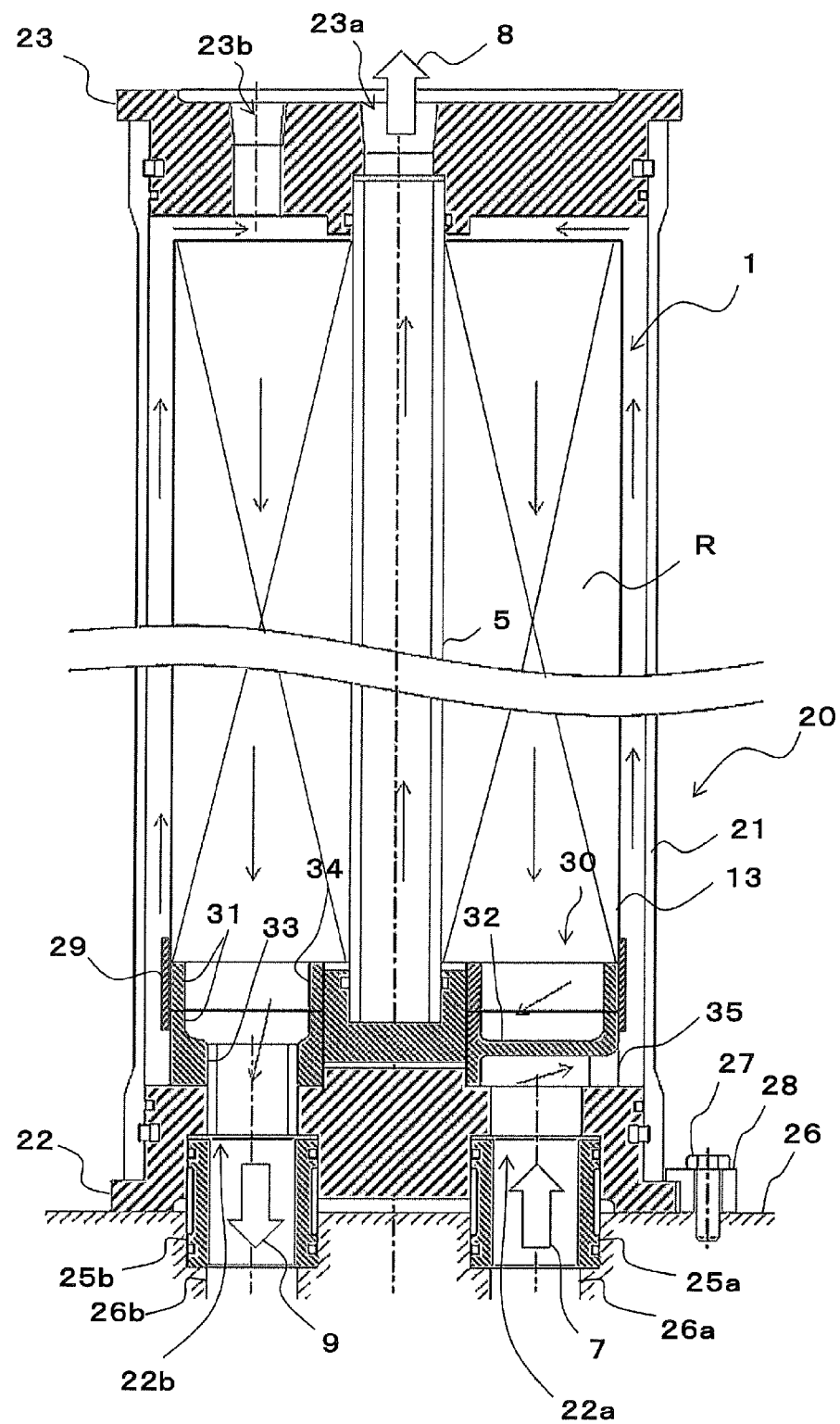
FIG. 7 is a vertically sectional view illustrating another example of the spiral membrane module of the present invention.

As illustrated in FIG. 1, the liquid-leading member 30 is arranged between the one end of the pressure vessel 20, and the membrane element 1. In the illustrated example, a tape 29 is wound around the liquid-leading member 30 and the membrane element 1 to straddle the member and the element to attain easy sealing. Moreover, the liquid-leading member 30 is arranged to contact a lower end of the wound body R of the membrane element 1, and an inner wall of one of the ends of the pressure vessel 20. At this time, the illustrated example has a structure in which outer walls of leg parts 35 contact an inner wall of the cylindrical member 21 to center the liquid-leading member 30. However, the centering may be attained in any different way (see FIG. 7).

Figure 3:
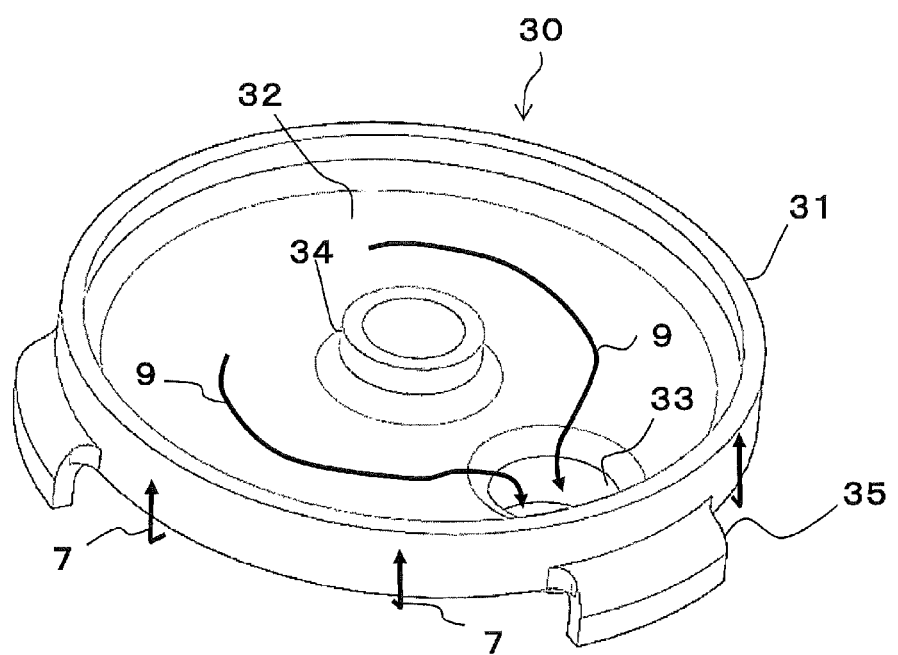
FIG. 3 is a perspective view illustrating an example of a liquid-leading member of the spiral membrane module of the present invention.

As illustrated in FIG. 3, the liquid-leading member 30 has dividing walls 31 to 33 that communicates the supplying portion 22a for the feed liquid 7 with an inside or outside of the exterior member 13 of the membrane element 1, and further communicates the discharge portion 22b for the concentrated liquid 9 with the inside or outside of the exterior member 13 of the membrane element 1 while the feed liquid 7 and the concentrated liquid 9 are prevented from being mixed with each other. In the present embodiment, an example has been described about the liquid-leading member 30 having the dividing wall 31 in a cylindrical form that is located adjacently to an end side of the exterior member 13, the dividing wall 32 in a disc form that is located on an inner peripheral side of the cylindrical dividing wall 31, and the dividing wall 33 in a ring form that communicates an opening made in the cylindrical dividing wall 32 with the discharge portion 22b for the concentrated liquid 9.

According to the illustrated liquid-leading member 30, the feed liquid 7 that has flowed in from the supplying portion 22a flows along the disc-form dividing wall 32 to the outside, and subsequently the feed liquid flows along the outer peripheral surface of the cylindrical dividing wall 31 to be led to the outside of the exterior member 13 of the membrane element 1. Moreover, inside the cylindrical dividing wall 31, the concentrated liquid 9 that has flowed out from the inside of the exterior member 13 of the membrane element 1 flows along the disc-form dividing wall 32 to be led on the ring-form dividing wall 33, and is then discharged from the discharge portion 22b for the concentrated liquid 9.

In the illustrated example, the cylindrical and ring-form dividing wall 33 is disposed. However, about the ring-form dividing wall 33, the shape thereof may be any shape as far as the shape is a shape capable of preventing the mixing of the feed liquid 7 and the concentrated liquid 9 with each other. The ring-form dividing wall 33 may be a ring-form dividing wall having a cross section in the form of a polygon such as an ellipse or rectangle.

In the illustrated example, the liquid-leading member 30 further has a ring-form supporting part 34 located at the center of the disc-form dividing wall 32, the central pipe 5 being inserted into this supporting part; and the leg parts 35, which are extended from the cylindrical dividing wall 31 to the inner wall of one of the ends of the pressure vessel 20.

The ring-form supporting part 34 may be made into a structure having one closed end. This structure allows to close an end of the central pipe 5. The ring-form supporting part 34 is preferably made into a length corresponding to the distance between the wound body R of the membrane element 1 and the inner wall of the end of the pressure vessel 20. However, the ring-form supporting part 34 may be formed to have such a length that only the one end of the ring-form supporting part contacts the wound body R, or the inner wall of the pressure vessel 20. The sectional shape of the ring-form supporting part 34 is not particularly limited.

In the illustrated example, the number of the leg parts 35, which the liquid-leading member 30 has, is three. However, the shape and the number of the leg parts 35 are not particularly limited as far as the shape and the number do not particularly hinder any flow of the liquid to the outside of the exterior member 13 of the membrane element 1. Furthermore, as a member separated from the liquid-leading member 30, a spacer may be located, which is an alternative for the leg parts 35.

(Other Embodiments of Spiral Membrane Module)

Figure 4:
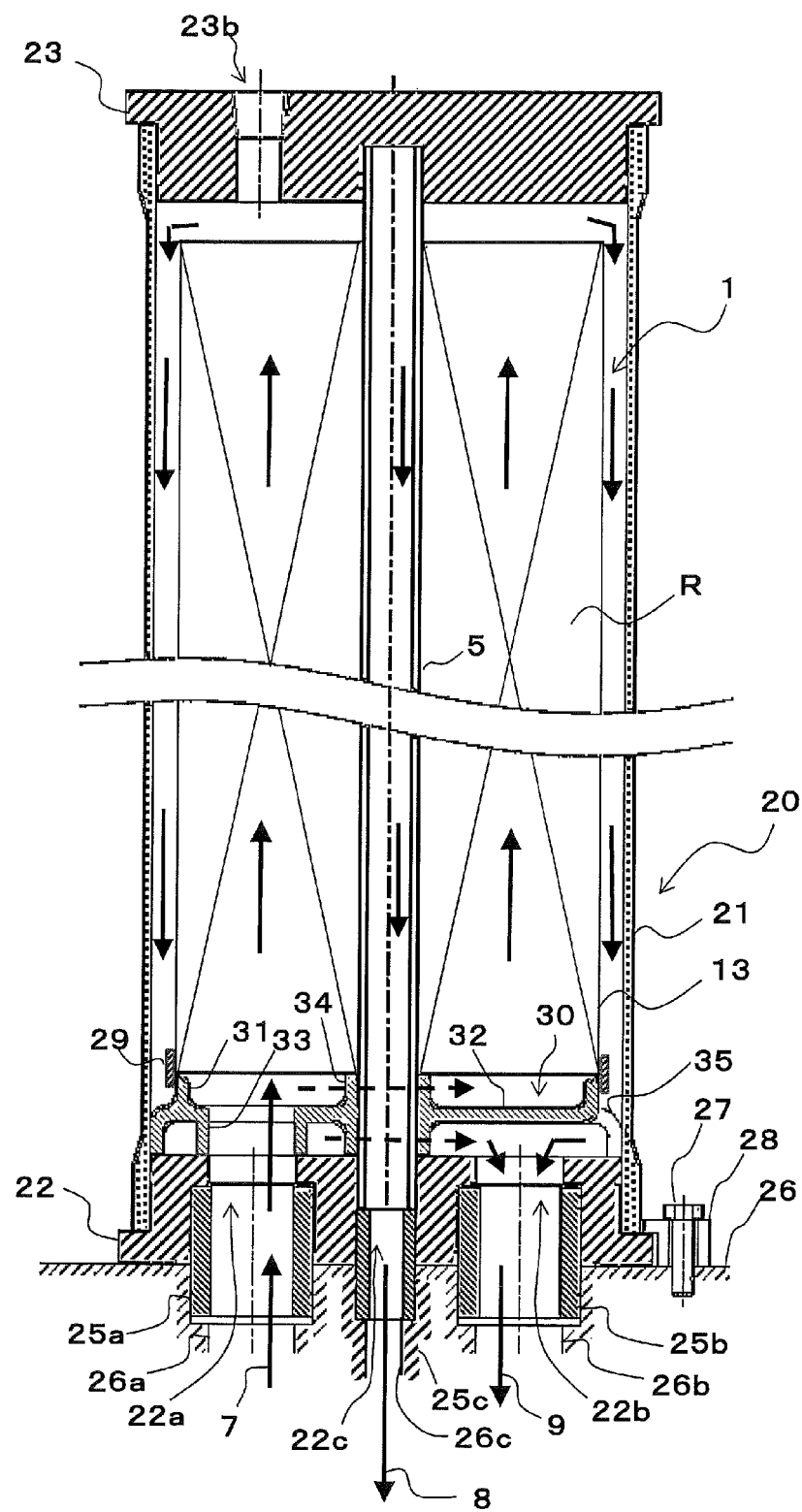
FIG. 4 is a vertically sectional view illustrating another example of the spiral membrane module of the present invention.

(1) In the above-mentioned embodiment, an example has been described in which the supplying portion 22a for the feed liquid 7 is communicated with the outside of the exterior member 13 of the membrane element 1, and the discharge portion 22b for the concentration liquid 9 is communicated with the inside of the exterior member 13 of the membrane element 1. As illustrated in FIG. 4, however, a liquid-leading member 30 having the same structure is usable to communicate a supplying portion 22a for a feed liquid 7 with the inside of an exterior member 13 of a membrane element 1, and communicate a discharge portion 22b for a concentrated liquid 9 with the outside of the exterior member 13 of the membrane element 1.

In this example, the feed liquid 7 that has flowed into from the supplying portion 22a is led to a ring-form dividing wall 33 to flow along a disc-form dividing wall 32 to the outside. Subsequently, the feed liquid flows to the inside of the exterior member 13 of the membrane element 1. After the membrane separation is performed, the concentrated liquid 9 that has flowed from the inside of the exterior member 13 of the membrane element 1 flows outside the exterior member 13. Subsequently, the concentrated liquid flows along the outer peripheral surface of a cylindrical dividing wall 31, and then flows to the inside thereof along the disc-form dividing wall 32. Thereafter, the concentrated liquid 9 is discharged from the discharge portion 22b for the concentrated liquid 9.

(2) In the above-mentioned embodiment, the upper member 23 fitted to the upper end has the discharge portion 23a for the permeation liquid 8. As illustrated in FIG. 4, however, a discharge portion 23c for a permeation liquid 8 may be located in a bottom member 22 fitted to a lower end of a membrane module.

In this case, an opening is made in the discharge portion 22c, for the permeation liquid 8, in the bottom member 22. This opening is an opening into which a connecting pipe 25c, to which an external pipe should be connected, is to be fitted in a liquid-sealed state. In the illustrated example, an external pipe 26c is fitted to a base stand 26, and the connecting pipe 25c is fitted into an opening made in the base stand 26 in a liquid-sealed state. In order to make the connecting pipes 25c into the liquid-sealed state, for example, an O ring is used, and further various structures for drop off-stopping may be adopted (all illustrations of the member and the structures are omitted).

Figure 5:
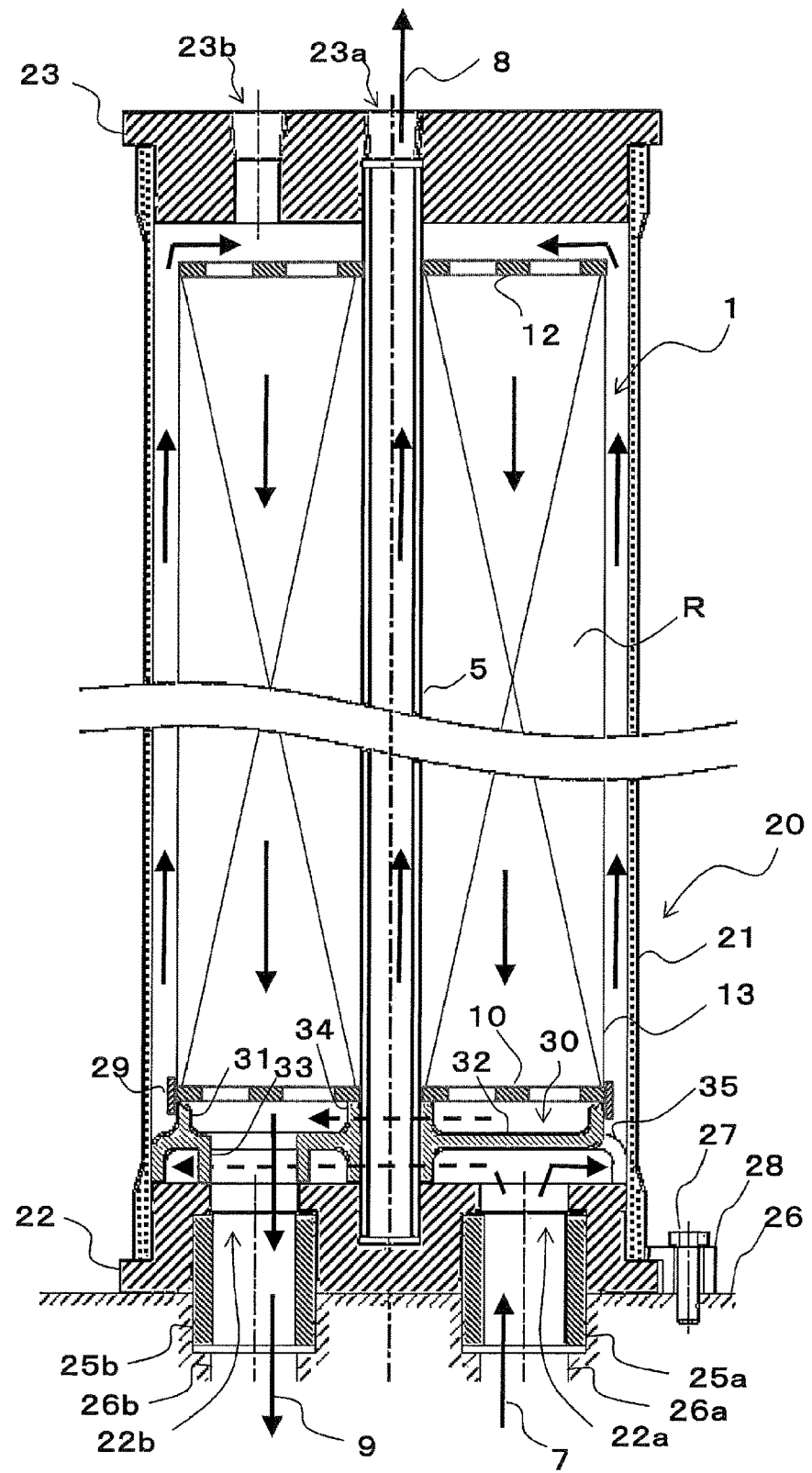
FIG. 5 is a vertically sectional view illustrating another example of the spiral membrane module of the present invention.

(3) In the above-mentioned embodiment, an example has been described in which respective end members on both sides of the membrane element 1 are omitted. As illustrated in FIG. 5, however, end members 10 and 12 may be located between a wound body R of a membrane element 1 and a liquid-leading member 30. In the illustrated example, a tape 29 is wound around the liquid-leading member 30, the end member 10 and the membrane element 1 to straddle these members, so that easy sealing is attained.

It is unnecessary that the end members 10 and 12 hold the sealing material. A structure thereof may be any structure as far as the structure has an opening to which a central pipe 5 can be inserted, and an opening through which a liquid is caused to flow. Examples of each of the end members 10 and 12 include a circular perforated plate; a shaped body in which an inside ring-form part and an outside ring-form part are linked to each other through spokes; and a combination of the two.

Figure 6:
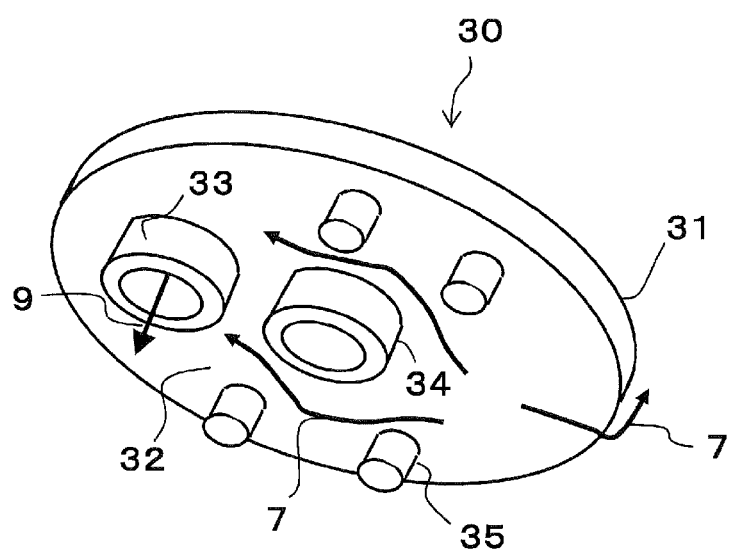
FIG. 6 is a perspective view illustrating another example of the liquid-leading member of the spiral membrane module of the present invention.

(4) In the above-mentioned embodiment, an example has been described which is the liquid-leading member 30 having the three leg parts 35 extended from the cylindrical dividing wall 31 to the inner wall of one of the ends of the pressure vessel 20. As illustrated in FIG. 6, however, the present invention has leg parts 35 extended from a disc-form dividing wall 32 to an inner wall of one end of a pressure vessel 20. The shape of each of the leg parts 35 is, for example, a cross portion in a circular, ellipsoid, or a polygon such as triangular or rectangular form.

Figure 8:
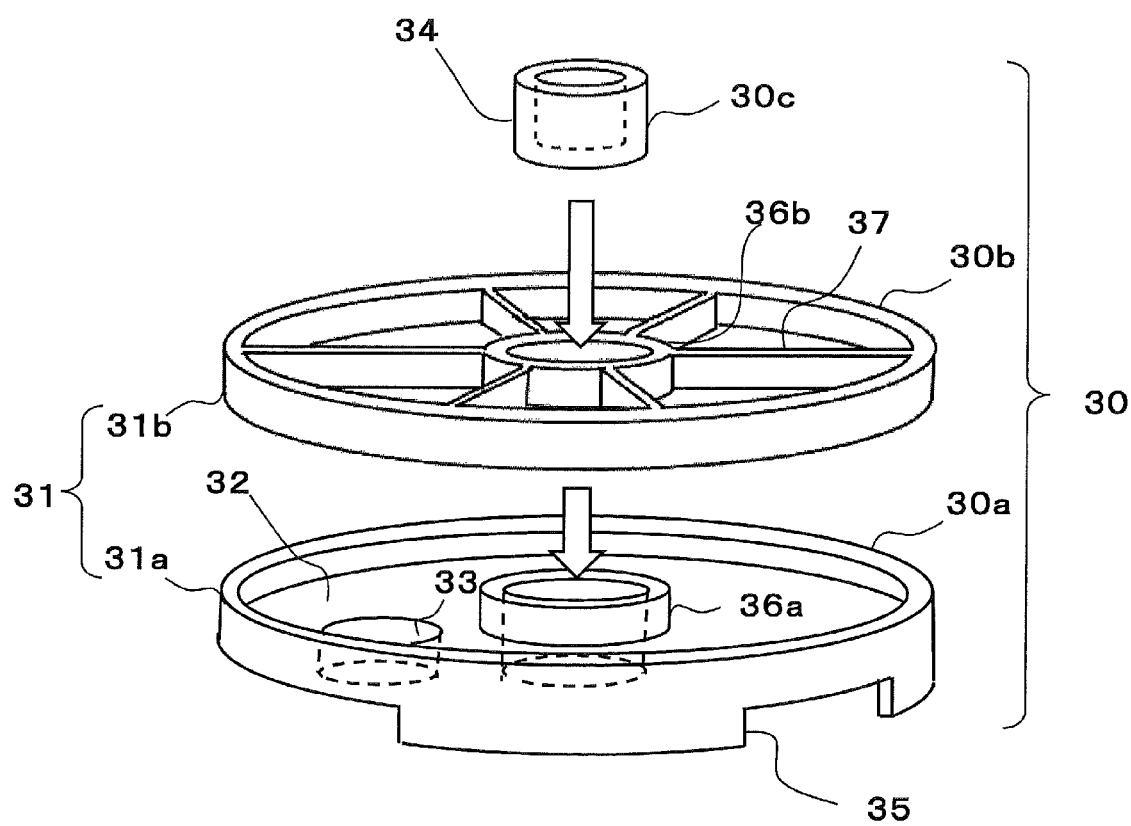
FIG. 8 is a fabrication perspective view illustrating another example of the liquid-leading member of the spiral membrane module of the present invention.

(5) In the above-mentioned embodiments, an example has been described about the liquid-leading member 30 is constituted by a single member. As illustrated in each of FIGS. 7 and 8, a liquid-leading member 30 is composed of plural members. In the illustrated example, the liquid-leading member 30 is composed of a disc-form dividing wall member 30a arranged below, a membrane supporting member 30b arranged over the wall member, and a cap member 30c inserted to these members. These members may be integrated with each other by, for example, bonding. However, the members are usable in the state that the members are separated from each other.

The disc-form dividing wall member 30a has a lower cylindrical dividing wall 31a, which is a portion of the cylindrical dividing wall 31; a disc-form dividing wall 32 located on the inner peripheral side of the cylindrical dividing wall; a ring-form dividing wall 33 through which an opening made in the disc-form dividing wall 32 is communicated with a discharge portion 22b for a concentrated liquid 9; and a lower ring-form holding part 36a for holding the cap member 30c located at the center of the disc-form dividing wall 32. In the illustrated examples, the lower ring-form holding part 36a can be fitted to the outside of a central convex portion of the bottom member 22 to attain the centering of the liquid-leading member by this lower ring-form holding part 36a.

The membrane supporting member 30b has an upper cylindrical dividing wall 31b, which is a portion of the cylindrical dividing wall 31, an upper ring-form holding part 36b for holding the cap member 30c located at the center of the upper cylindrical dividing wall, and communicating parts 37 through which the upper cylindrical dividing wall 31b and the upper ring-form holding part 36b are communicated with each other. In this example, the number of the positions where the communicating parts 37 are located is six. However, the number may be smaller. Reversely, the number of the positions where the communicating parts 37 are located may be seven or more.

The cap member 30c has an opening into which the central pipe 5 is fitted. This cap member, together with an O-ring (not illustrated) held inside the opening, has a function of keeping the central pipe 5 in a liquid-sealed state. A ring-form supporting part 34 into which the central pipe 5 is to be inserted is constituted by this cap member 30c, the upper ring-form holding part 36b, and the lower ring-form holding part 36a.

When the liquid-leading member 30 is composed of plural members, it is preferred to seal any space between the members. As illustrated in, for example, FIG. 7, a tape 29 is wound around a lower cylindrical dividing wall 31a and an upper cylindrical dividing wall 31b of a liquid-leading member 30, and a membrane element 1 to straddle these members, so that easy sealing can be attained.

DESCRIPTION OF REFERENCE SIGNS

1 Membrane element
2 Separation membrane
3 Permeation-side flow-channel member
5 Central pipe
5a Opening
6 Supply-side flow-channel member
7 Feed liquid
8 Permeation liquid
9 Concentrated liquid
13 Exterior member
20 Pressure vessel
22a Supplying portion for feed liquid
22b Discharge portion for concentrated liquid
23a Discharge portion for permeation liquid
30 Liquid-leading member
31 Cylindrical dividing wall (dividing wall)
32 Disc-form dividing wall (dividing wall)
33 Ring-form dividing wall (dividing wall)
R Wound body

The invention claimed is:
1. A spiral membrane module, comprising:
a membrane element comprising:
   a central pipe having a hole,
   a wound body comprising: a membrane member comprising: a separation membrane, a supply-side flow-channel sheet and a permeation-side flow-channel sheet, the membrane member wound around the central pipe, and
   an exterior member located on an outer periphery of the wound body;
a pressure vessel that holds the membrane element and has two axial ends, the pressure vessel further having a supplying opening for a feed liquid and a discharge opening for a concentrated liquid at one of the axial ends of the pressure vessel, and a discharge opening for a permeation liquid at any one of the axial ends; and
a liquid-leading member arranged between the one of the axials ends of the pressure vessel and the membrane element,
wherein the liquid-leading member has a cylindrical dividing wall located adjacently to an end side of the exterior member, a disc-form dividing wall located on an inner peripheral side of the cylindrical dividing wall, a ring-form dividing wall that communicates an opening made in the disc-form dividing wall with the discharge opening for the concentrated liquid, and a plurality of leg parts extended from the disc-form dividing wall or the cylindrical dividing wall to an inner wall of one of the axial ends of the pressure vessel, and
wherein the liquid-leading member communicates the supplying opening for the feed liquid with an outside or an inside of the exterior member of the membrane element, and further communicates the discharge opening for the concentrated liquid with the inside or outside of the exterior member of the membrane element while the feed liquid and the concentrated liquid are prevented from being mixed with each other.

2. The spiral membrane module according to claim 1, wherein the dividing wall of the liquid-leading member is a wall that leads the feed liquid flowing in from the supplying opening for the feed liquid into the outside of the exterior member, and that leads the concentrated liquid flowing out from the membrane element to the discharge opening for the concentrated liquid.

3. The spiral membrane module according to claim 1, wherein the axial direction of the pressure vessel is vertically located.

4. The spiral membrane module according to claim 3, wherein the one of the axial ends of the pressure vessel is located on a lower side of the pressure vessel.

5. The spiral membrane module according to claim 1, wherein the liquid-leading member further has a ring-form support located at a center of the disc-form dividing wall to which the central pipe is inserted.

6. The spiral membrane module according to claim 2, wherein the axial direction of the pressure vessel is vertically located.

* * * * *